(12) United States Patent
Xu

(10) Patent No.: US 12,489,682 B2
(45) Date of Patent: Dec. 2, 2025

(54) NETWORK FUNCTION REGISTRATION METHOD, DISCOVERY METHOD, APPARATUS, DEVICE AND MEDIUM

(71) Applicant: GUANGDONG OPPO MOBILE TELECOMMUNICATIONS CORP., LTD., Guangdong (CN)

(72) Inventor: Yang Xu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 18/474,666

(22) Filed: Sep. 26, 2023

(65) Prior Publication Data

US 2024/0015069 A1 Jan. 11, 2024

Related U.S. Application Data

(63) Continuation of application No. 17/805,392, filed on Jun. 3, 2022, now abandoned, which is a continuation (Continued)

(30) Foreign Application Priority Data

Apr. 6, 2021 (CN) .......................... 202110368838.6

(51) Int. Cl.
*H04L 41/0895* (2022.01)
*H04L 41/0806* (2022.01)
*H04L 41/122* (2022.01)

(52) U.S. Cl.
CPC ...... *H04L 41/0895* (2022.05); *H04L 41/0806* (2013.01); *H04L 41/122* (2022.05)

(58) Field of Classification Search
CPC .......................... H04L 41/0895; H04L 41/122; H04L 41/0806
(Continued)

(56) References Cited

U.S. PATENT DOCUMENTS 10,299,128 B1 * 5/2019 Suthar ....................... H04L 9/30
11,632,667 B2 * 4/2023 Shariat .................... H04W 4/06
370/329

(Continued)

FOREIGN PATENT DOCUMENTS

CN 109803242 A 5/2019
CN 110167195 A 8/2019

(Continued)

OTHER PUBLICATIONS

3GPP TR 23.700-91 V0.5.0 (Sep. 2020)—3rd Generation Partnership Project; Technical Specification Group Services and System Aspects; Study on enablers for network automation for the 5G System (5GS); Phase 2 (Release 17) (304 pages).

(Continued)

*Primary Examiner* — Liang Che A Wang
(74) *Attorney, Agent, or Firm* — PERKINS COIE LLP

(57) ABSTRACT

The present application discloses a network function registration method and discovery method, an apparatus, a device and a medium belonging to the mobile communication field. The method introduces S-NSSAI, a DNN and a data processing method in the network function registration and discovery processes, so that the S-NSSAI, DNN and data processing method can be directly provided to a consumer network function in a network function discovery process for use.

8 Claims, 4 Drawing Sheets

Related U.S. Application Data of application No. PCT/CN2021/102504, filed on Jun. 25, 2021.

(58) Field of Classification Search
USPC .................................................. 709/220, 222
See application file for complete search history.

(56) References Cited

U.S. PATENT DOCUMENTS

| | | | | |
|---|---|---|---|---|
| 2018/0227873 | A1* | 8/2018 | Vrzic | H04W 60/04 |
| 2018/0270781 | A1* | 9/2018 | Baek | H04W 60/06 |
| 2019/0150081 | A1* | 5/2019 | Qiao | H04W 60/00 |
| | | | | 370/329 |
| 2020/0396678 | A1 | 12/2020 | Lee | |
| 2021/0105308 | A1* | 4/2021 | Bouazizi | H04L 65/1016 |
| 2021/0112404 | A1* | 4/2021 | Xin | H04M 15/58 |
| 2021/0367854 | A1* | 11/2021 | Lee | H04L 41/5058 |

FOREIGN PATENT DOCUMENTS

| | | | |
|---|---|---|---|
| CN | 110291837 | A | 9/2019 |
| CN | 110324807 | A | 10/2019 |
| CN | 110324867 | A | 10/2019 |
| CN | 110402603 | A | 11/2019 |
| CN | 110679185 | A | 1/2020 |
| CN | 110798360 | A | 2/2020 |
| CN | 110876154 | A | 3/2020 |
| CN | 111201823 | A | 5/2020 |
| CN | 112385201 | A | 2/2021 |
| CN | 112437456 | A | 3/2021 |
| CN | 112512096 | A | 3/2021 |
| CN | 112583693 | A | 3/2021 |
| CN | 112586060 | A | 3/2021 |
| EP | 3742799 | A1 | 11/2020 |
| JP | 2006215875 | A | 8/2006 |
| WO | 2019072058 | A1 | 4/2019 |
| WO | 2020025028 | A1 | 2/2020 |
| WO | 2020223219 | A1 | 11/2020 |
| WO | 2020238411 | A1 | 12/2020 |

OTHER PUBLICATIONS

3GPP TS 23.288 V16.4.0 (Jul. 2020)—3rd Generation Partnership Project; Technical Specification Group Services and System Aspects; Architecture enhancements for 5G System (5GS) to support network data analytics services (Release 16) (62 pages).
3GPP TS 23.502 V16.7.0 (Dec. 2020)—3rd Generation Partnership Project; Technical Specification Group Services and System Aspects; Procedures for the 5G System (5GS); Stage 2 (Release 16) (590 pages).
International Search Report mailed Jan. 6, 2022 of PCT/CN2021/102504 (6 pages).
SA WG2 Temporary Document—3GPP SA WG2 Meeting #139E—S2-2004528 Jun. 1-12, 2020, Elbonia—(Revision of S2-203758)—OPPO, Two-level hierarchical NWDAF Architecture (4 pages).
SA WG2 Temporary Document—3GPP SA WG2 Meeting #139E S2-2003758—Jun. 1-12, 2020, Elbonia—(Revision of S2-200xxxx)—OPPO, Two-level hierarchical NWDAF Architecture (4 pages).
First Office Action of the CN application No. 202210016652.9, issued on Jul. 6, 2023. 12 pages with English translation.
Search Report of the EP application No. 21899278.2, issued on Jun. 22, 2023. 15 pages.
Ericsson, Add evaluation to Solution # 10 "Secure initial access to an SNPN onboarding network", 3GPP TSG-SA3 Meeting #102 bis-e e-meeting. Mar. 1-5, 2021 S3-211006. 3 pages.
Non-Final Office Action for U.S. Appl. No. 17/805,392 issued Mar. 9, 2023. 13 pages.
Final Office Action for U.S. Appl. No. 17/805,392 issued Jun. 26, 2023. 8 pages.
Advisory Action for U.S. Appl. No. 17/805,392 issued Sep. 8, 2023. 4 pages.
Search Report for European Application No. 21899278.2 Issued Sep. 26, 2023, 12 Pages.
Second Office Action for Chinese Application No. 202210016652.9 Issued Oct. 17, 2023, 9 Pages with English Translation.
Written Opinion of the International Searching Authority for International Application No. PCT/CN2021/102504 Issued Jan. 6, 2022, 7 Pages with English Translation.
Examination Report for European Application No. 21899278.2 Issued Mar. 25, 2024, 5 Pages.
Notice of First Office Action of the Japanese application No. 2022-542272, issued on Mar. 25, 2025. 6 pages with English translation.
Notice of Reasons for Refusal of the Indian application No. 202217061558, issued on Jan. 15, 2025. 7 pages.
Notice of Preliminary Rejection of the Korean application No. 10-2022-7019883, issued on Jul. 4, 2025. 11 pages with English translation.

\* cited by examiner

NETWORK FUNCTION REGISTRATION METHOD, DISCOVERY METHOD, APPARATUS, DEVICE AND MEDIUM

CROSS-REFERENCE TO RELATED APPLICATION(S)

This application is a continuation of the U.S. application Ser. No. 17/805,392, filed on Jun. 3, 2022, which is a continuation of the International PCT Application No. PCT/CN2021/102504, having an international filing date of Jun. 25, 2021, which claims priority to Chinese Application No. 202110368838.6 entitled "Network Function Registration Method, Discovery Method, Apparatus, Device and Medium" and filed on Apr. 6, 2021. The entire contents of the above-identified applications are incorporated herein by reference.

TECHNICAL FIELD

Embodiments of the present application relate to the field of mobile communication, and more particularly, to a network function registration method, a network function discovery method, an apparatus, a device and a medium.

BACKGROUND

A service-based architecture is provided in a network architecture of a new radio (NR) system. A register network function (NF) in a core network provides specific services in the name of a service provider, and provides the services to other consumer NFs through predefined reference points.

Registration and discovery processes are provided in the service-based architecture. That is, a register NF registers its characteristic information to a network repository function (NRF), while a consumer NF carries necessary characteristic information when requesting to discover a target network function from the NRF, and the NRF finds an appropriate register NF for the consumer NF according to the characteristic information and returns corresponding parameters.

SUMMARY

The present application provides a network function registration method, a network function discovery method, an apparatus, a device and a medium. The technical solutions are as follows.

According to one aspect of the present application, there is provided a network function registration method, which includes: a first network function sends a registration request to a second network function, at least one of single-network slice selection assistance information (S-NSSAI), a data network name (DNN) and a data processing method of the first network function being carried in the registration request.

Illustratively, the first network function includes a register NF and the second network function includes an NRF. Optionally, the register NF is a functional entity belonging to an application server or a data network (DN). The second network function is a functional entity of a core network.

According to one aspect of the present application, there is provided a network function registration method, which includes: a second network function receives a registration request sent by a first network function, at least one of S-NSSAI, a DNN and a data processing method of the first network function being carried in the registration request.

Illustratively, the first network function includes a register NF and the second network function includes an NRF. Optionally, the register NF is a functional entity belonging to an application server or a DN. The second network function is a functional entity of a core network.

According to another aspect of the present application, there is provided a network function discovery method, which includes: a third network function sends a discovery request to a second network function, the discovery request being used for requesting to discover a target network function (NF); and the third network function receives a discovery response sent by the second network function, an identity and at least one of S-NSSAI, a DNN and a data processing method of the target NF being carried in the discovery response.

Illustratively, the second network function includes an NRF and the third network function includes a consumer NF. Optionally, both the second network function and the third network function are functional entities of a core network.

According to one aspect of the present application, there is provided a network function discovery method, which includes: a second network function receives a discovery request sent by a third network function, the discovery request being used for requesting to discover a target NF; and the second network function sends a discovery response to the third network function, an identity and at least one of S-NSSAI, a DNN and a data processing method of the target NF being carried in the discovery response.

Illustratively, the second network function includes an NRF and the third network function includes a consumer NF. Optionally, both the second network function and the third network function are functional entities of a core network.

According to one aspect of the present application, there is provided a network function registration apparatus, which includes a first sending module, wherein the first sending module is configured to send a registration request to a second network function, at least one of S-NSSAI, a DNN and a data processing method of a first network function being carried in the registration request.

Illustratively, the second network function includes an NRF.

According to one aspect of the present application, there is provided a network function registration apparatus, which includes a second receiving module, wherein the second receiving module is configured to receive a registration request sent by a first network function, at least one of S-NSSAI, a DNN and a data processing method of the first network function being carried in the registration request.

Illustratively, the first network function includes a register NF.

According to one aspect of the present application, there is provided a network function discovery apparatus, which includes a third sending module and a third receiving module, wherein the third sending module is configured to send a discovery request to a second network function, the discovery request being used for requesting to discover a target network function (NF); and the third receiving module is configured to receive a discovery response sent by the second network function, an identity and at least one of S-NSSAI, a DNN and a data processing method of the target NF being carried in the discovery response.

Illustratively, the second network function includes an NRF.

According to one aspect of the present application, there is provided a network function discovery apparatus, which includes a fourth receiving module and a fourth sending module, wherein the fourth receiving module is configured to receive a discovery request sent by a third network function, the discovery request being used for requesting to discover a target NF; and the fourth sending module is configured to send a discovery response to the third network function, an identity and at least one of S-NSSAI, a DNN and a data processing method of the target NF being carried in the discovery response.

Illustratively, the third network function includes a consumer NF.

According to one aspect of the present application, there is provided a network function device including a processor and a memory, the memory storing a computer program, which is loaded and executed by the processor to implement the network function registration method or the network function discovery method as described above.

According to another aspect of the present application, there is provided a computer-readable storage medium having stored thereon a computer program, which is loaded and executed by a processor to implement the network function registration method or the network function discovery method as described above.

According to another aspect of the present application, there is provided a computer program product including computer instructions stored in a computer-readable storage medium. A processor of a computer device reads the computer instructions from the computer-readable storage medium, and the processor executes the computer instructions to cause the computer device to perform the network function registration method or the network function discovery method provided in the above aspects.

According to another aspect of the present application, there is provided a chip configured to perform the network function registration method or the network function discovery method provided in the above aspects.

Beneficial effects brought by the technical solutions provided by the embodiments of the present application include at least the following.

By providing at least one of the S-NSSAI, DNN, and data processing method of the target NF in the registration process and the discovery process, the NRF can provide the information to the consumer NF in the NF discovery process, and the consumer NF can carry out subsequent interaction with the target NF by using the information, thereby providing a registration process and a discovery process with richer functions, which, in a scenario with a plurality of consumer NFs, can reduce the amount of signaling or the amount of payload when the target NF interacts with the plurality of consumer NFs.

BRIEF DESCRIPTION OF THE DRAWINGS

In order to describe the technical solutions in the embodiments of the present application more clearly, the drawings that need to be used in the description of the embodiments will be briefly introduced below. It is apparent that the drawings described below are only some embodiments of the present application, and for those of ordinary skills in the art, other drawings may be obtained according to these drawings without paying inventive efforts.

DETAILED DESCRIPTION

Exemplary embodiments, examples of which are shown in the accompanying drawings, will be described in detail herein. When the following description relates to the drawings, unless otherwise stated, the same numbers in different drawings indicate the same or similar elements. Implementations described below in the exemplary embodiments do not represent all implementations consistent with the present application. Rather, they are merely examples of apparatuses and methods consistent with some aspects of the present application as detailed in the appended claims.

It should be understood that as mentioned herein, "several" refers to one or more and "a plurality of" refers to two or more. The term "and/or" describes an association relationship between associated objects, indicating that there may be three relationships, for example, A and/or B may indicate three cases: A alone, both A and B, and B alone. The symbol "/" generally indicates that there is a "or" relationship between the associated objects before and after "/".

Figure 1:
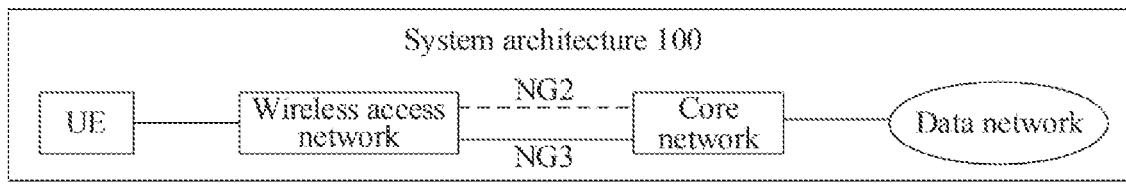
FIG. 1 depicts a block diagram of a communication system in accordance with an exemplary embodiment of the present application.

FIG. 1 is a schematic diagram of architecture of a communication system in accordance with an exemplary embodiment of the present application. As shown in FIG. 1, the system architecture 100 may include a user equipment (UE), a radio access network (RAN), a core network (Core), and a data network (DN). The UE, RAN and Core are the main components constituting the architecture, and can logically be divided into two parts: a user plane and a control plane. The control plane is responsible for management of a mobile network, and the user plane is responsible for transmission of service data. In FIG. 1, an NG2 reference point is located between the RAN control plane and the Core control plane, an NG3 reference point is located between the RAN user plane and the Core user plane, and an NG6 reference point is located between the Core user plane and a data network.

The UE, which is an entrance of interaction of a mobile user with the network, can provide basic computing ability and storage ability, display service windows to the user and receive operation inputs from the user. The UE can establish signal connection and data connection with the RAN by using the next generation air interface technology, so as to transmit control signals and service data to the mobile network.

The RAN, which is similar to a base station in a traditional network, is deployed near the UE, provides network access function for authorized users within coverage of a cell, and is able to transmit user data by using transmission tunnels of different qualities according to user levels, service requirements, etc. The RAN can manage its resources to for reasonable use, provide an access service for the UE as needed, and forward control signals and user data between the UE and the core network.

The Core is responsible for maintaining subscription data of the mobile network, managing network functions of the mobile network, and providing functions such as session management, mobility management, policy management and security authentication for the UE. When the UE is attached, the Core provides network access authentication for the UE; when the UE has a service request, the Core allocates a network resource to the UE; when the UE moves, the Core updates the network resource for the UE; when the UE is idle, the Core provides a fast recovery mechanism for the UE; when the UE is detached, the Core releases the network resource for the UE; when the UE has service data, the Core provides a data routing function for the UE, such as forwarding uplink data to the DN, or receiving downlink data of the UE from the DN and forward it to the RAN, so as to send it to the UE.

The DN is a data network that provides services for users. Generally, a client is located in the UE and a server is located in the data network. The data network may be a private network, such as a local area network, or may be an external network, such as the Internet, which is not controlled by an operator, or may be a proprietary network jointly deployed by operators, for example, in order to configure IP multimedia core network subsystem (IMS) services.

Figure 2:
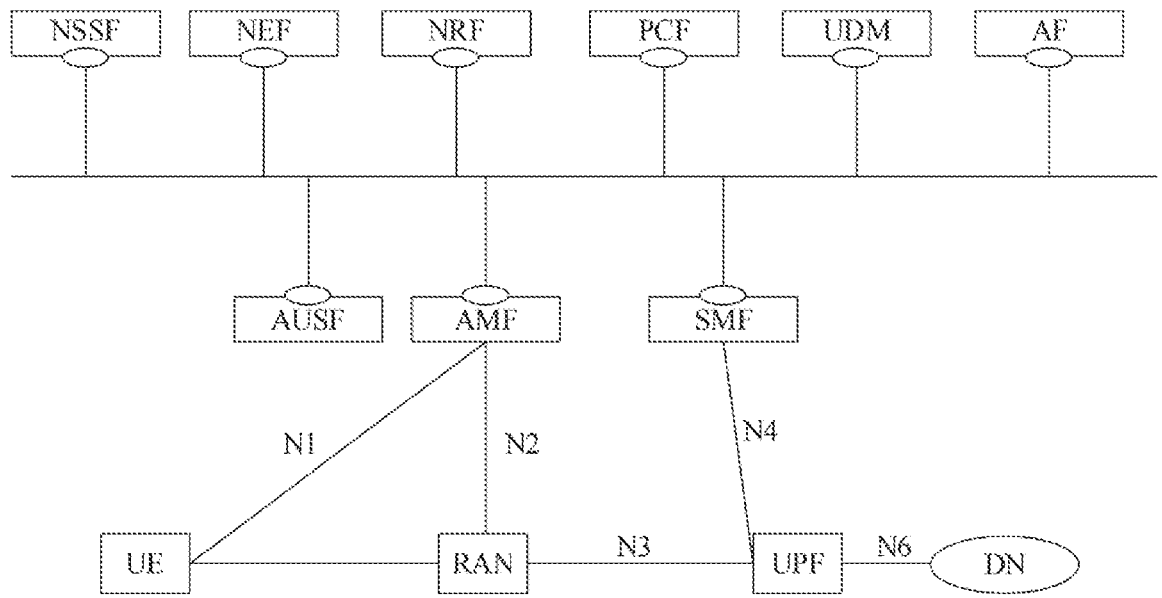
FIG. 2 depicts a block diagram of a communication system in accordance with an exemplary embodiment of the present application.

FIG. 2 is a detailed architecture determined on the basis of FIG. 1, including a plurality of specific network functions (NF), also referred to as network functional entities or network entities or functional entities or network elements. Illustratively, the core network user plane includes a user plane function (UPF); the core network control plane includes an authentication server function (AUSF), an access and mobility management function (AMF), a session management function (SMF), a network slice selection function (NSSF), a network exposure function (NEF), an NRF, unified data management (UDM), a policy control function (PCF) and an application function (AF). The functions of these functional entities are as follows.

The UPF performs forwarding of user data packets according to routing rules of the SMF.

The AUSF performs security authentication of the UE.

The AMF is in charge of access and mobility management.

The SMF is in charge of session management.

The NSSF selects a network slice for the UE.

The NEF exposes a network function to a third party via an API interface.

The NRF provides a storage function and a selection function of information of the network functional entities for other network functions.

The UDM is charge of user subscription context management.

The PCF is charge of user policy management.

The AF is charge of user application management.

In the architecture shown in FIG. 2, an N1 interface is a reference point between the UE and the AMF; an N2 interface is a reference point between the RAN and the AMF, which is used to, for example, send NAS messages; an N3 interface is a reference point between the RAN and the UPF, which is used to, for example, transmit data of the user plane; an N4 interface is a reference point between the SMF and the UPF, which is used to transmit, for example, information such as tunnel identification information of an N3 connection, data buffering indication information and downlink data notification information; an N6 interface is a reference point between the UPF and the DN, which is used to, for example, transmit data of the user plane. An NG interface is an interface between a wireless access network and a 5G core network.

It should be noted that the names of the interfaces between various network functions in FIGS. 1 and 2 are only examples, other names of the interfaces may be possible in specific implementations, and are not specifically limited in the embodiments of the present application. The names of various network functions (such as the SMF, AF, UPF, etc.) included in FIGS. 1 and 2 are also only examples, and do not constitute limitation to the functions of the network functions. Other names of the various network functions described above may also be possible in 5GS and other future networks, and are not specifically limited in the embodiments of the present application. For example, in a 6G network, the terms in 5G can continue to be used for some or all of the various network functions described above or other names may be used, which are uniformly explained herein and will not be repeated below. Further, it should be understood that the names of messages (or signaling) transmitted between the various network functions described above are also only examples and do not constitute any limitation to the functions of the messages.

Figure 3:
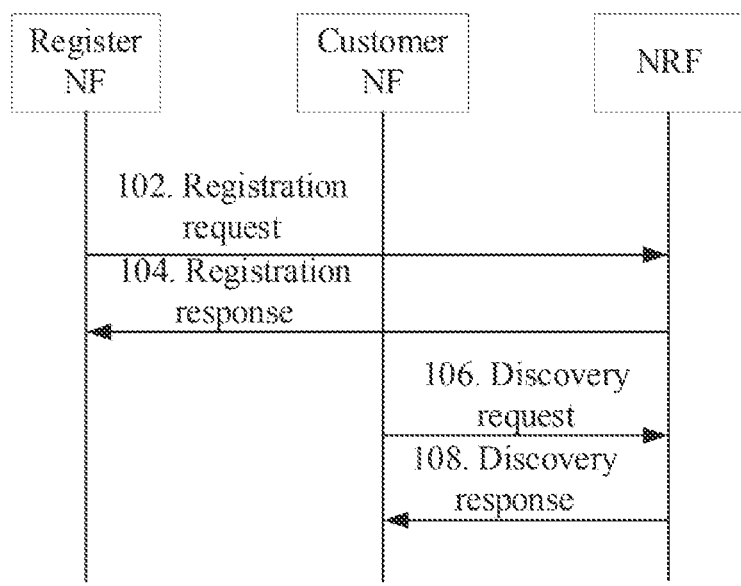
FIG. 3 depicts a flowchart of a network function registration and discovery method in accordance with an exemplary embodiment of the present application.

FIG. 3 depicts a flowchart of a network function registration and discovery method in accordance with an exemplary embodiment of the present application. The method is performed by a mobile communication system as described above as an example in this embodiment. The method includes:

Registration process (or registration method):

In step 102, a register NF sends a registration request to an NRF.

Illustratively, the register NF is any one of the NFs shown in FIG. 2 except the NRF, or an NF provided in an existing communication protocol in other 5G networks. For example, the register NF is an AF. The register NF may be referred to as a first NF.

The NRF is an NF used for providing related services for the NF registration process and discovery process. The NRF may be referred to as a second NF.

The registration request is a request for NF registration with the NRF. The specific name of the registration request may vary for different NFs, but a request can be considered as a registration request as long as its function is to carry out NF registration.

The registration request includes at least one of an NF identity (ID), an application ID, an event ID and a UE ID. The NF ID is used to uniquely indicate the register NF. The NF ID is represented by an AF ID in the case that the register NF is an AF. The application ID is used to indicate a certain or particular or designated application program, application or service. For example, the application ID can be used to indicate an application program corresponding to a target NF or an application program run by the target NF or an application program associated with the target NF. The event ID is used to indicate an event corresponding to the target NF or an event responded by the target NF or an event associated with the target NF. The UE ID is used to indicate a UE associated with the target NF or a UE supported and served by the target NF. Illustratively, the above information can be used to search for or index the register NF.

Illustratively, at least one of S-NSSAI, a DNN and a data processing method of the register NF is also carried in the registration request. The S-NSSAI and/or the DNN are attribute information of the register NF in a protocol data unit (PDU) session dimension. The data processing method is attribute information of the register NF in a data processing dimension.

Illustratively, attribute information of a PDU session at least includes the S-NSSAI and/or the DNN.

Illustratively, the data processing method of the register NF is carried in the registration request. The data processing method is also referred to as a data processing mode, a method of processing data, a mode of processing data, an option of processing data, or the like. The data processing method may be identified by a data processing method ID.

Illustratively, the data processing method includes, but is not limited to, any one of the following three methods.

Data Anonymization

Data anonymization is also referred to as exact data anonymization. Data anonymization is a kind of data conversion technology, in which with data being effectively processed, people cannot associate the data with a personal identity, target or organization. Data anonymization is a means of privacy protection.

Data Aggregation

Data aggregation, which is also referred to as aggregation option, refers to merging data from different data sources.

Data Normalization:

Data normalization is also referred to as normalization option. Data normalization is to convert raw data according to a certain proportion through a certain mathematical transformation mode, such that it falls within a small specific interval, for example, an interval of 0 to 1 or −1 to 1, eliminate differences in characteristic attributes such as property, dimension and order of magnitude between different variables, and transform them into dimensionless relative values, that is, normalized values, so that values of various indexes are at the same order of magnitude, thereby facilitating comprehensive analysis and comparison of indexes in different units or orders of magnitude.

Data min-max scaling is a kind of data normalization used widely. Data min-max scaling is to convert data into an interval [0, 1]; data normalization is to convert data into a designated interval, which is not limited to the interval [0, 1].

Accordingly, the NRF receives the registration request sent by the register NF. The NRF stores the register NF and various information corresponding to the register NF, the various information including at least one of the AF ID, the application ID, the event ID, the S-NSSAI, the DNN and the data processing method.

In step 104, the NRF sends a registration response to the register NF.

Accordingly, the register NF receives the registration response sent by the NRF.

In different embodiments, the specific name of the registration response may vary. However, a response message can be considered as a registration response as long as its function is to reply to the registration request.

Discovery Process (or Discovery Method):

In step 106, a consumer NF sends a discovery request to the NRF.

Illustratively, the consumer NF is any one of the NFs shown in FIG. 2 except the NRF, or an NF provided in an existing communication protocol in other 5G networks. For example, the consumer NF is a network data analytics function (NWDAF). The consumer NF may be referred to as a third NF.

Illustratively, the discovery request is a request for NF discovery from the NRF or the discovery request is a request for discovering a target NF. The specific name of the discovery request may vary for different NFs, but a request can be considered as a discovery request as long as its function is to carry out NF discovery.

Accordingly, the NRF receives the discovery request sent by the consumer NF.

Optionally, characteristic information of the target NF to be discovered is carried in the discovery request. The characteristic information of the target NF includes, but is not limited to, at least one of an application ID, an event ID, a UE ID, and a requested data processing method.

In step 108, the NRF sends a discovery response to the consumer NF.

The NRF selects a register NF, which conforms to the discovery request, as the target NF (at least) from a plurality of register NFs. The NRF sends the discovery response to the consumer NF, an identity of the target NF and at least one of the S-NSSAI, the DNN and the data processing method of the target NF being carried in the discovery response.

The NRF acquires the characteristic information of the target NF from the discovery request, and selects a register NF, which matches the characteristic information, as the target NF from the plurality of register NFs.

Optionally, the S-NSSAI and/or the DNN of the target NF are attribute information of the PDU session. That is, the attribute information of the PDU session is attribute information of a PDU session corresponding to the target NF, or in other words, the attribute information of the PDU session registered by the target NF in the registration process.

Optionally, the data processing method is a data processing method used or registered by the target NF.

Accordingly, the consumer NF receives the discovery response sent by the NRF.

Optionally, when the discovery process is failed, information of the target NF is not carried in the discovery response sent by the NRF to the consumer NF.

In different embodiments, the specific name of the discovery response may vary. However, a response message can be considered as a discovery response as long as its function is to reply to the discovery request.

It should be noted that an order in which the registration process and the discovery process are performed is not limited. The registration process can be performed before the discovery process; or the registration process and the discovery process can be performed simultaneously; or the discovery process can be performed before the registration process. For the same register NF, the registration process may be performed more than once, for example, a first registration is carried out at a first moment, and then a second registration is carried out at a second moment when the capability or information of the register NF varies, which is not limited in the present application.

To sum up, in the method provided by the embodiment, by providing at least one of the S-NSSAI, the DNN and the data processing method of the target NF in the registration process and discovery process, the NRF can provide the information to the consumer NF in the NF discovery process, and the consumer NF can carry out subsequent interaction with the target NF by using the information, thereby providing a registration process and a discovery process with richer functions, which, in a scenario with a plurality of consumer NFs, can reduce the amount of signaling or the amount of payload when the target NF interacts with the plurality of consumer NFs.

Figure 4:
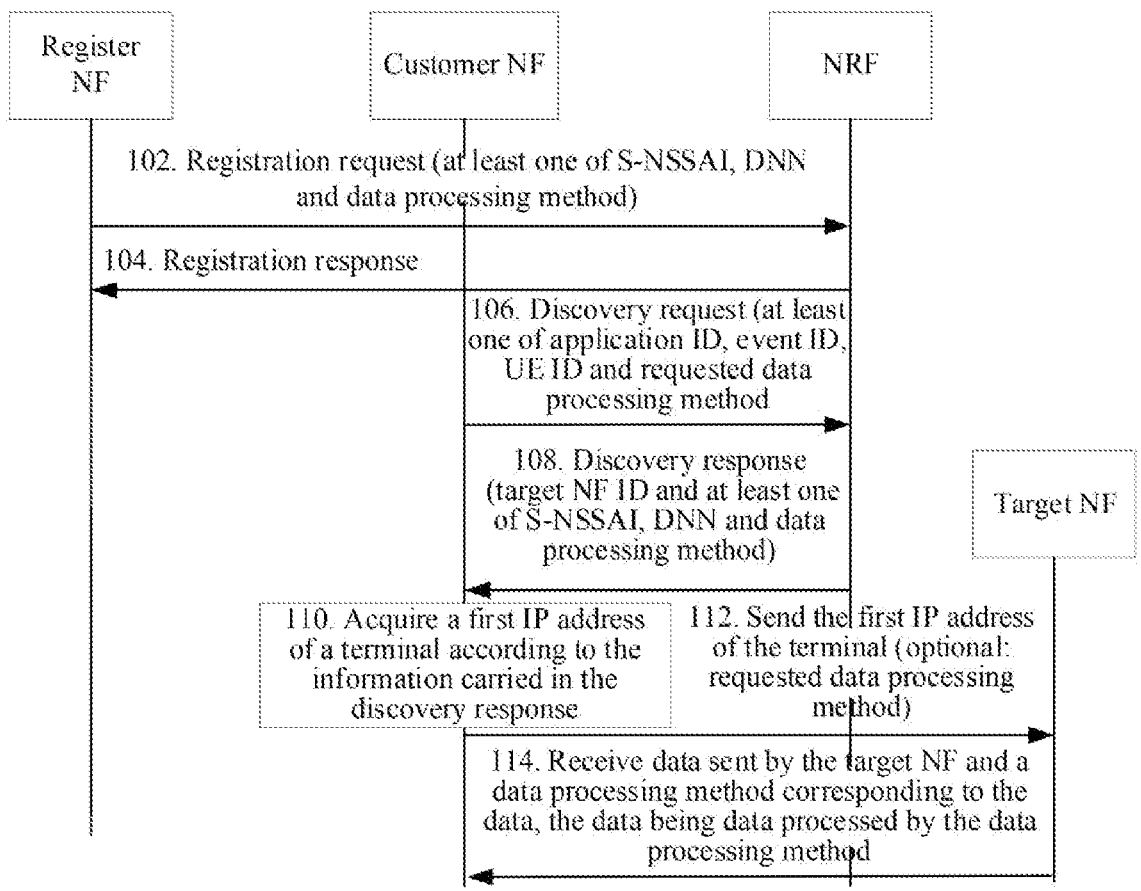
FIG. 4 depicts a flowchart of a network function registration and discovery method in accordance with an exemplary embodiment of the present application.

FIG. 4 depicts a flowchart of a network function registration and discovery method in accordance with an exemplary embodiment of the present application. The method is performed by a mobile communication system as described above as an example in this embodiment. The method includes:

Registration process (or registration method):

In step 102, a register NF sends a registration request to an NRF.

Illustratively, the register NF is any one of the NFs shown in FIG. 2 except the NRF, or an NF provided in an existing communication protocol in other 5G networks. For example, the register NF is an AF. The register NF may be referred to as a first NF.

The NRF is an NF used for providing related services for the NF registration process and discovery process. The NRF may be referred to as a second NF.

The registration request is a request for NF registration with the NRF. The specific name of the registration request may vary for different NFs, but a request can be considered as a registration request as long as its function is to carry out NF registration.

Illustratively, at least one of S-NSSAI, a DNN and a data processing method of the register NF is carried in the registration request.

Illustratively, attribute information of a PDU session of the register NF is carried in the registration request.

Illustratively, the attribute information of the PDU session at least includes the S-NSSAI and/or the DNN.

Illustratively, the data processing method of the register NF is carried in the registration request. The data processing method is also referred to as a data processing mode, a method of processing data, a mode of processing data, an option of processing data, or the like. The data processing method includes, but is not limited to, any one of the following three methods: data anonymization, data aggregation, and data normalization.

Illustratively, at least one of an AF ID, an application ID, a UE ID and an event ID of the register NF is also carried in the registration request.

The AF ID is used to indicate an ID of the register NF.

The application ID is used to indicate a certain or particular or designated application program, application or service. For example, the application ID can be used to indicate an application program supported by the register NF, or an application program run by the register NF, or an application program corresponding to the register NF, or an application program associated with the register NF.

The UE ID is used to indicate a UE associated with the register NF.

The event ID is used to indicate an event supported by the register NF, or an event to which the register NF can respond, or an event corresponding to the register NF, or an event associated with the register NF.

Accordingly, the NRF receives the registration request sent by the register NF. The NRF stores the register NF and various information corresponding to the register NF, the various information including at least one of the AF ID, the application ID, the event ID, the S-NSSAI, the DNN and the data processing method.

In step 104, the NRF sends a registration response to the register NF.

Accordingly, the register NF receives the registration response sent by the NRF. Illustratively, information indicating that registration is successful is carried in the registration response.

In different embodiments, the specific name of the registration response may vary. However, a response message can be considered as a registration response as long as its function is to reply to the registration request.

Discovery Process (or Discovery Method):

In step 106, a consumer NF sends a discovery request to the NRF.

Illustratively, the consumer NF is any one of the NFs shown in FIG. 2 except the NRF, or an NF provided in an existing communication protocol in other 5G networks. For example, the consumer NF is a network data analytics function (NWDAF). The consumer NF may be referred to as a third NF.

Illustratively, the discovery request is a request for NF discovery from the NRF or the discovery request is a request for discovering a target NF. The specific name of the discovery request may vary for different NFs, but a request can be considered as a discovery request as long as its function is to carry out NF discovery.

Illustratively, characteristic information of the target NF to be discovered is carried in the discovery request.

Illustratively, at least one of an application ID, an event ID, a UE ID and a requested data processing method is carried in the discovery request. That is, the characteristic information of the target NF may be represented by at least one of the application ID, the event ID, the UE ID, and the requested data processing method.

Accordingly, the NRF receives the discovery request sent by the consumer NF. The NRF determines the target NF according to the information carried in the discovery request. For example, the NRF selects a target NF, which matches the information carried in the discovery request, from a plurality of candidate register NFs.

In the case that the application ID is carried in the discovery request, the NRF selects a target NF, which matches the application ID, from the plurality of candidate register NFs; in the case that the event ID is carried in the discovery request, the NRF selects a target NF, which matches the event ID, from the plurality of candidate register NFs; in the case that the UE ID is carried in the discovery request, the NRF selects a target NF, which is used to serve the UE ID, from the plurality of candidate register NFs; in the case that the requested data processing method is carried in the discovery request, the NRF selects a target NF, which supports or adopts the requested data processing method, from the plurality of candidate register NFs.

In the case that multiple kinds of characteristic information is carried in the discovery request, the NRF selects a register NF, which matches all of the characteristic information, as the target NF from the plurality of candidate register NFs; or selects a register NF, which matches at least one kind of the characteristic information, as the target NF from the plurality of candidate register NFs; or selects preferentially a register NF, which matches as much characteristic information as possible, as the target NF from the plurality of candidate register NFs.

In step 108, the NRF sends a discovery response to the consumer NF.

The NRF selects a register NF, which conforms to the discovery request, as the target NF (at least) from the plurality of register NFs. The NRF sends the discovery response to the consumer NF, an identity of the target NF and at least one of the S-NSSAI, the DNN and the data processing method of the target NF being carried in the discovery response.

Optionally, the attribute information of the PDU session is attribute information of a PDU session corresponding to the target NF, or in other words, the attribute information of the PDU session registered by the target NF in the registration process.

In different embodiments, the specific name of the discovery response may vary. However, a response message can be considered as a discovery response as long as its function is to reply to the discovery request.

Accordingly, the consumer NF receives the discovery response sent by the NRF.

In step 110, the consumer NF acquires a first Internet protocol (IP) address of a terminal according to the information carried in the discovery response.

In the case that the terminal has established a plurality of PDU sessions, the terminal will have a plurality of IP addresses. For each of the PDU sessions, the terminal has an IP address which is in one-to-one correspondence with the PDU session. For example, the same terminal has established a PDU session for video playing with a first AF, a PDU session for chat with a second AF, a PDU session for web browsing with a third AF, and the like.

Illustratively, the first IP address of the terminal is one or more of all IP addresses of the terminal; or the first IP address of the terminal is an IP address corresponding to the target NF among all IP addresses of the terminal.

There is a corresponding relationship between the IP addresses of the terminal and the attribute information of the PDU sessions. The corresponding relationship is stored in the consumer NF, or the corresponding relationship is stored in another NF but the consumer NF can query or read the corresponding relationship from the other NF.

Illustratively, the consumer NF selects the IP address corresponding to the target NF from all IP addresses of the terminal according to the S-NSSAI and/or the DNN. For example, the consumer NF stores a corresponding relationship between the IP addresses of the terminal and the S-NSSAI and/or the DNN. Illustratively, the corresponding relationship is shown as below in Table 1:

TABLE 1

| Terminal identity | IP address | S-NSSAI and/or DNN |
|---|---|---|
| UE 1 | IP address 1 | S-NSSAI 1 |
| UE 1 | IP address 2 | S-NSSAI 2 |
| UE 1 | IP address 3 | DNN 1 |
| UE 2 | IP address 4 | S-NSSAI 3 |

As another example, the corresponding relationship is stored in another NF, and the consumer NF sends a query request, in which the UE ID and the attribute information (S-NSSAI and/or DNN) of the PDU session are carried, to the other NF, which returns the first IP address of the terminal to the consumer NF.

In step 112, the consumer NF sends the first IP address of the terminal to the target NF.

Illustratively, the target NF is one or more of the plurality of register NFs, for example, the target NF is an AF.

Accordingly, the target NF receives the first IP address of the terminal sent by the consumer NF.

Optionally, the consumer NF transmits the first IP address of the terminal and the requested data processing method to the target NF. The first IP address and the requested data processing method may be carried in the same message for transmission or may be carried in different messages for transmission.

In step 114, the consumer NF receives data sent by the target NF and a data processing method corresponding to the data. The terminal data is data processed by the data processing method.

The target NF can provide data to the consumer NF. The data is any possible data interchanged between different network functions in the mobile communication system, such as UE data of one or more UEs, data of an access network device, data of a core network device, data of an AF side, etc.

Optionally, the data is raw data or processed data. For example, the data is data processed by the data processing method requested by the consumer NF or data processed by a default or configured data processing method.

When the target NF provides the data to the consumer NF, the target NF can provide the data processing method corresponding to the data to the consumer NF.

It should be noted that an order in which the registration process and the discovery process are performed is not limited. The registration process can be performed before the discovery process; or the registration process and the discovery process can be performed simultaneously; or the discovery process can be performed before the registration process. For the same register NF, the registration process may be performed more than once, for example, a first registration is carried out at a first moment, and then a second registration is carried out at a second moment when the capability or information of the register NF varies, which is not limited in the present application.

To sum up, in the method provided by the embodiment, by providing at least one of the S-NSSAI, the DNN and the data processing method of the target NF in the registration process and the discovery process, the NRF can provide the information to the consumer NF in the NF discovery process, and the consumer NF can carry out subsequent interaction with the target NF by using the information, thereby providing a registration process and a discovery process with richer functions, which, in a scenario with a plurality of consumer NFs, can reduce the amount of signaling or the amount of payload when the target NF interacts with the plurality of consumer NFs.

In the method provided by the embodiment, in addition, the first IP address of the terminal is provided to the target NF by the consumer NF according to the information carried in the discovery response, without providing all the IP addresses of the terminal to the target NF, thus ensuring that other IP addresses of the terminal are not necessarily revealed.

In the method provided by the embodiment, in addition, by carrying the requested data processing method in the discovery request, the register NF having the requested data processing method is preferentially discovered as the target NF in the case that there is a plurality of register NFs. A new discovery mode is provided besides the discovery mode based on the characteristic information such as the application ID, event ID and UE ID.

Figure 5:
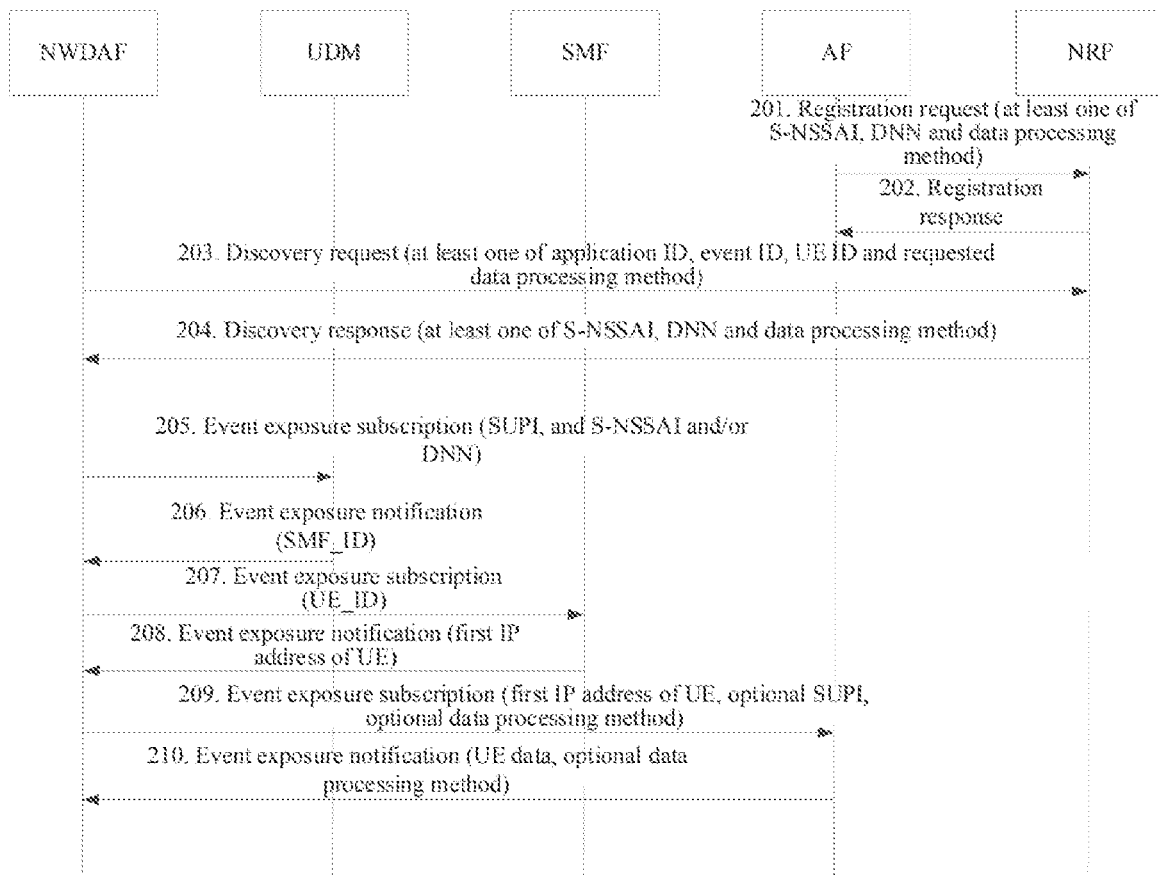
FIG. 5 depicts a flowchart of a network function registration and discovery method in accordance with an exemplary embodiment of the present application.

FIG. 5 depicts a flowchart of a network function registration and discovery method in accordance with an embodiment of the present application. A register NF is an AF and a consumer NF is an NWDAF as an example in description of this embodiment. The method includes:

Registration process (or registration method):

In step 201, the AF sends a registration request to an NRF.

Illustratively, the registration request is an NF management update_NF update request of an Nnrf interface (Nnrf_NFManNnrf_NFManagement_NFUpdate_request).

Illustratively, at least one of S-NSSAI, a DNN and a data processing method of the AF is carried in the registration request. The data processing method includes, but is not limited to, any one of the following three methods: data anonymization, data aggregation, and data normalization.

Illustratively, attribute information of a PDU session of the AF, i.e., the S-NSSAI and/or the DNN, is carried in the registration request.

Optionally, at least one of an AF ID, an application ID, an event ID and a UE ID of the AF is also carried in the registration request.

In step 202, the NRF sends a registration response to the AF.

Illustratively, the registration response is an NF management update_NF update response of an Nnrf interface (Nnrf_NFManNnrf_NFManagement_NFUpdate_responese).

Discovery Process (or Discovery Method):

In step 203, the NWDAF sends a discovery request to the NRF.

Optionally, the discovery request is an NF discovery request of the Nnrf interface (Nnrf_NFDiscovery_request). The discovery request is a request for discovering a target NF.

Optionally, at least one of an application ID, an event ID, a UE ID and a requested data processing method is carried in the discovery request.

Step 204: The NRF sends a discovery response to the NWDAF.

Optionally, the discovery response is an NF discovery response of the Nnrf interface (Nnrf_NFDiscovery_response).

Optionally, the (target) AF ID of the target NF and at least one of the S-NSSAI, the DNN and the data processing method of the target NF are carried in the discovery response.

Illustratively, in order to find an appropriate AF for communication (e.g., find an AF to collect UE data for it), the NWDAF sends the discovery request to the NRF, the discovery request containing characteristic information (such as at least one of the application ID, the event ID, the UE ID and the requested data processing method) of the target AF, with which the NRF matches an appropriate target AF and carries information of the target AF in the discovery response to return to the NWDAF, the discovery response including at least one of the S-NSSAI, the DNN and the data processing method of the target AF.

Illustratively, the AF is used to provide Internet services, such as video browsing, web browsing, online gaming, and instant messaging etc. for the UE. The UE accesses the Internet services provided by the AF through PDU sessions, each PDU session having unique attribute information (such as S-NSSAI and/or a DNN), and the UE has an IP address in each PDU session. The NWDAF is a data sensing and analysis network function, which automatically senses and analyzes a mobile network based on network data, so as to improve the resource utilization efficiency of the mobile network. For example, the NWDAF analyzes UE data when one or more UEs are using a particular Internet service, and guides subsequent resource allocation of the mobile network. In the analysis process, the NWDAF needs to first acquire the UE data of the one or more UEs from the AF side as data to be analyzed.

Interaction process between the NWDAF and the target NF:

In step 205, the NWDAF sends a first message to a UDM.

The first message is event exposure subscription of an Nudm interface (Nudm_EventExposure_Subscribe). Illustratively, at least one of a subscription permanent identifier (SUPI), SNSSAI and a DNN is carried in the first message. The SUPI is a kind of UE ID.

In step 206, the UDM sends a second message to the NWDAF.

The second message is an event exposure notification of the Nudm interface (Nudm_EventExposure_Notify). Illustratively, an SMF ID is carried in the second message.

In step 207, the NWDAF sends a third message to an SMF.

The third message is event exposure subscription of an Nsmf interface (Nsmf_EventExposure_Subscribe).

Illustratively, the UE ID is carried in the third message.

In step 208, the SMF sends a fourth message to the NWDAF.

The fourth message is an event exposure notification of the Nsmf interface (Nsmf_EventExposure_Notify). Illustratively, the (first) IP address of the UE is carried in the fourth message.

The (first) IP address of the UE is one or more of all IP addresses of the UE. Optionally, the (first) IP address of the UE is an IP address corresponding to the target AF among all IP addresses of the UE.

In step 209, the NWDAF sends a fifth message to the target AF.

The fifth message is event exposure subscription of a Naf interface (Naf_EventExposure_Subscribe). Illustratively, the (first) IP address of the UE is carried in the fifth message. Optionally, the SUPI, which is a kind of the UE ID, is also carried in the fifth message.

After the NWDAF obtains the UE ID, S-NSSAI and DNN through the above steps 205 to 209, the NWDAF determines the SMF serving the UE according to the UE ID. The NWDAF sends a query request to the SMF, the S-NSSAI and/or DNN being carried in the query request, and the SMF uniquely determines a target PDU session, which is a PDU session between the UE and the target AF, according to the S-NSSAI and/or DNN, and then the SMF feeds back the IP address of the UE in the target PDU session to the NWDAF. As such, the NWDAF obtains the first IP address of the UE.

The NWDAF sends the uniquely determined first IP address of the UE to the target AF so as to use the first IP address to indicate to the target AF which UE it corresponds to, thereby avoiding sending all IP addresses of the UE to the target AF and reducing potential security hazards.

Optionally, there may be a plurality of UEs, for example, the NWDAF needs to analyze a plurality of UEs in the same area or a plurality of UEs in the same network slice.

Optionally, the requested data processing method is also carried in the fifth message. The requested data processing method is used to indicate a data processing method in data processing of the target AF requested by the NWDAF.

In step 210, the target AF sends a sixth message to the NWDAF.

The sixth message is an event exposure notification of the Naf interface (Naf_EventExposure_Notify). Illustratively, data, which is, for example, UE data of one or more UEs, is carried in the sixth message. The UE data may be power consumption data, application program usage records, application program usage duration, application program usage experience or evaluation, movement trajectory, etc., of the UE.

Illustratively, the target AF may provide data, which may be data processed by the target AF, to the NWDAF. For example, the target AF collects the UE data of a plurality of UEs, processes the collected UE data, and sends the processed UE data to the NWDAF. Illustratively, one or more pieces of data are processed by using the data processing method carried in the fifth message in the process that the target AF provides the data to the NWDAF. Alternatively, one or more pieces of data are processed by using a default or configured data processing method in the process that the target AF provides the data to the NWDAF.

Optionally, in the case that the UE data is the processed data, the data processing method used for the UE data is also carried in the sixth message.

After receiving the UE data of the one or more UEs, the NWDAF analyzes and processes the UE data.

To sum up, in the method provided by the embodiment, by providing at least one of the S-NSSAI, the DNN and the data processing method of the target NF in the registration process and the discovery process, the NRF can provide the information to the consumer NF in the NF discovery process, and the consumer NF can carry out subsequent interaction with the target NF by using the information, thereby providing a registration process and a discovery process with richer functions, which, in a scenario with a plurality of consumer NFs, can reduce the amount of signaling or the amount of payload when the target NF interacts with the plurality of consumer NFs.

The method provided by the embodiment further solves the problem that the consumer NF needs to reveal all IP addresses of a UE to a third party, so that the consumer NF only needs to send the first IP address (associated with the target NF) of the UE to the target NF without sending all IP addresses of a UE to the AF. The method provided by the embodiment also makes full use of the related processes and mechanisms, and modification to the related technologies is minor.

The above method can be split variously and combined into new embodiments according to the understanding of those skilled in the art, for example, split into new embodiments according to the registration process and the discovery process, or split into new embodiments according to various executive subjects (i.e., network functions), which will not be repeated herein.

Figure 6:
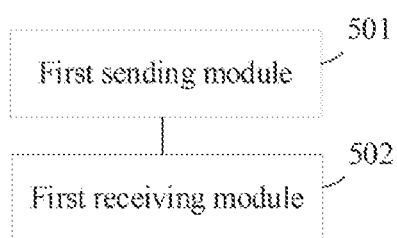
FIG. 6 depicts a block diagram of a network function registration apparatus in accordance with another exemplary embodiment of the present application.

FIG. 6 depicts a block diagram of a network function registration apparatus in accordance with an embodiment of the present application. The apparatus may be implemented to become the entirety or a part of a register network function, or applied in a register network function, or applied in a first network function. The apparatus includes a first sending module 501.

The first sending module 501 is configured to send a registration request to a second network function, at least one of S-NSSAI, a DNN and a data processing method of a first network function being carried in the registration request.

In one possible design, the data processing method includes at least one of data anonymization, data aggregation and data normalization.

In one possible design, at least one of an NF identity, an application identity, an event identity and a terminal identity of the first network function is also carried in the registration request.

In one possible design, the apparatus further includes a first receiving module 502, which is configured to receive a registration response sent by the second network function.

In one possible design, the first network function and the second network function are functional entities at a core network side.

In one possible design, the second network function is an NRF.

Figure 7:
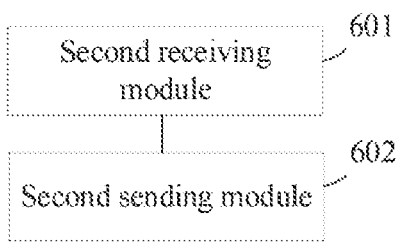
FIG. 7 depicts a block diagram of a network function registration apparatus in accordance with another exemplary embodiment of the present application.

FIG. 7 depicts a block diagram of a network function registration apparatus in accordance with an embodiment of the present application. The apparatus may be implemented to become the entirety or a part of an NRF, or applied in an NRF. The apparatus includes a second receiving module 601.

The second receiving module 601 is configured to receive a registration request sent by a first network function, at least one of S-NSSAI, a DNN and a data processing method of the first network function being carried in the registration request.

In one possible design, the data processing method includes at least one of data anonymization, data aggregation and data normalization.

In one possible design, at least one of an NF identity, an application identity, an event identity and a terminal identity of the first network function is also carried in the registration request.

In one possible design, the apparatus further includes a second sending module 602, which is configured to send a registration response to the first network function.

In one possible design, the first network function and a second network function are functional entities at a core network side.

In one possible design, the second network function is an NRF.

Figure 8:
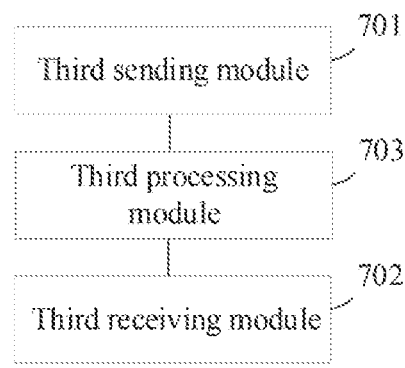
FIG. 8 depicts a block diagram of a network function discovery apparatus in accordance with another exemplary embodiment of the present application.

FIG. 8 depicts a block diagram of a network function discovery apparatus in accordance with an embodiment of the present application. The apparatus may be implemented to become the entirety or a part of a consumer network function, or applied in a consumer network function. The apparatus includes a third sending module 701 and a third receiving module 702.

The third sending module is configured to send a discovery request to s second network function, the discovery request being used for requesting to discover a target network function (NF), or the discovery request being a request to discover a target NF.

The third receiving module is configured to receive a discovery response sent by the second network function, an identity of the target NF and at least one of S-NSSAI, a DNN and a data processing method being carried in the discovery response.

In one possible design, the data processing method includes at least one of data anonymization, data aggregation and data normalization.

In one possible design, at least one of an application identity, an event identity, a UE identity and a requested data processing method is carried in the discovery request.

In one possible design, the target NF is determined by the second network function according to the information carried in the discovery request.

In one possible design, the apparatus further includes a third processing module 703.

The third processing module 703 is also configured to acquire a first Internet Protocol (IP) address of a terminal according to the information carried in the discovery response; and the third sending module 701 is also configured to send the first IP address of the terminal to the target NF. Optionally, the third processing module 703 is configured for a third network function to determine the first IP address of the terminal according to the S-NSSAI and/or the DNN carried in the discovery response.

In one possible design, the first IP address of the terminal is one or more of all IP addresses of the terminal. In one possible design, the first IP address of the terminal is an IP address corresponding to the target NF among all IP addresses of the terminal.

In one possible design, the third sending module 701 is also configured to send the requested data processing method to the target NF.

In one possible design, the third receiving module 702 is also configured to receive data sent by the target NF and a data processing method corresponding to the data, the data being data processed by the data processing method.

In one possible design, the third network function and the second network function are functional entities at a core network side.

In one possible design, the second network function is an NRF.

Figure 9:
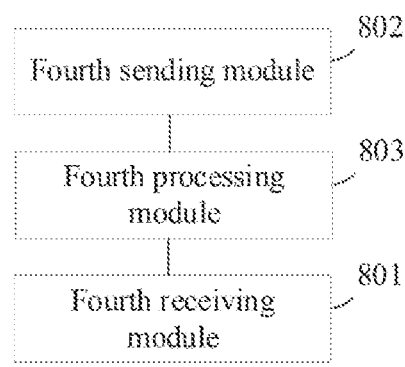
FIG. 9 depicts a block diagram of a network function discovery apparatus in accordance with another exemplary embodiment of the present application.

FIG. 9 depicts a block diagram of a network function discovery apparatus in accordance with an embodiment of the present application. The apparatus may be implemented to become the entirety or a part of an NRF, or applied in an NRF. The apparatus includes a fourth receiving module 801 and a fourth sending module 802.

The fourth receiving module 801 is configured to receive a discovery request sent by a third network function, the discovery request being used for requesting to discover a target NF, or the discovery request being a request to discover a target NF.

The fourth sending module 802 is configured to send a discovery response to the third network function, an identity of the target NF and at least one of S-NSSAI, a DNN and a data processing method of the target NF being carried in the discovery response.

In one possible design, the data processing method includes at least one of data anonymization, data aggregation and data normalization.

In one possible design, at least one of an application identity, an event identity, a UE identity and a requested data processing method is carried in the discovery request.

In one possible design, the apparatus further includes a fourth processing module 803 configured to determine the target NF according to the information carried in the discovery request.

In one possible design, the third network function and a second network function are functional entities at a core network side.

In one possible design, the second network function is an NRF.

Figure 10:
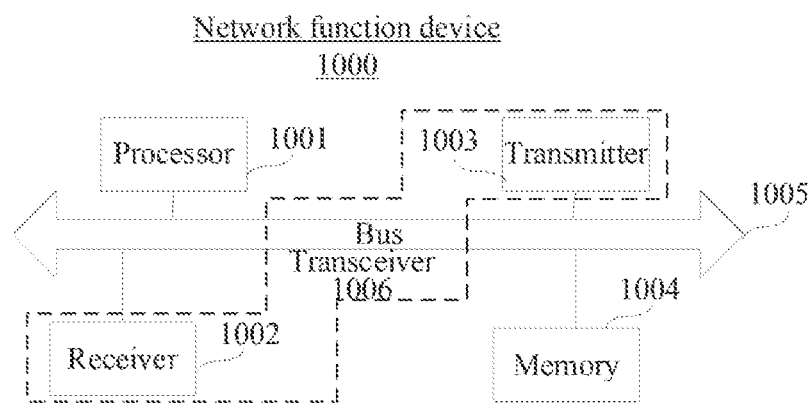
FIG. 10 depicts a block diagram of a network function device in accordance with an exemplary embodiment of the present application.

FIG. 10 depicts a schematic diagram of a structure of a network function device in accordance with an embodiment of the present application. For example, the network function device may be configured to perform the network function registration method and/or network function discovery method described above. Specifically, the network function device 1000 may include a processor 1001 a receiver 1002, a transmitter 1003, a memory 1004 and a bus 1005.

The processor 1001 includes one or more than one processing cores. The processor 1001 performs various functional applications and information processing by running software programs and modules.

The receiver 1002 and the transmitter 1003 may be implemented as a transceiver 1006, which may be a communication chip.

The memory 1004 is connected to the processor 1001 via the bus 1005.

The memory 1004 may be configured to store a computer program, and the processor 1001 is configured to execute the computer program to implement various steps performed by a network function device, an access network entity, a core network function or a core network entity in the method embodiments described above.

The transmitter 1003 is configured to perform the steps related to transmission in various method embodiments described above. The receiver 1002 is configured to perform the steps related to reception in various method embodiments described above. The processor 1001 is configured to perform other steps except the transmission and reception steps in various embodiments described above.

Additionally, the memory 1004 may be implemented by any type of volatile or non-volatile storage devices or combinations thereof. The volatile or non-volatile storage devices include, but are not limited to: a Random Access Memory (RAM), a Read-Only Memory (ROM), an Erasable Programmable Read-Only Memory (EPROM), an Electrically Erasable Programmable Read-Only Memory (EEPROM), a flash memory or other solid-state storage technologies, a Compact Disc Read-Only Memory (CD-ROM), a Digital Video Disc (DVD) or other optical storage devices, a magnetic tape cassette, a magnetic tape, a magnetic disk storage or other magnetic storage devices.

In an exemplary embodiment, a network function device, which includes a processor and a memory, is also provided. The memory stores a computer program, which is loaded and executed by the processor to implement the network function registration method and/or the network function discovery method as described above.

In an exemplary embodiment, a terminal, which includes a processor and a memory, is also provided. The memory stores a computer program, which is loaded and executed by the processor to implement the network function registration method and/or the network function discovery method as described above.

The present application further provides a computer-readable storage medium having stored thereon at least one instruction, at least one segment of program, a code set or an instruction set, which is loaded and executed by a processor to implement the network function registration method and/or the network function discovery method provided by the method embodiments described above.

Optionally, the present application further provides a computer program product including computer instructions stored in a computer-readable storage medium. A processor of a computer device reads the computer instructions from the computer-readable storage medium, and the processor executes the computer instructions to cause the computer device to perform the network function registration method and/or the network function discovery method provided in the above aspects.

The serial numbers of the embodiments of the present application described above are intended for description only, and do not represent advantages or disadvantages of the embodiments.

Those of ordinary skills in the art may understand that all or part of the steps for implementing the embodiments described above may be accomplished through hardware, or may be accomplished through programs instructing related hardware. The programs may be stored in a computer-readable storage medium, which may be a read only memory, a magnetic disk or an optical disk.

What described above is only optional embodiments of the present application, and is not intended to limit the present application. Any modification, equivalent substitution, improvement, etc., made within the spirit and principle of the present application shall be included in the protection scope of the present application.

The invention claimed is:

1. A network function discovery method comprising:
sending, by a Network Data Analytics Function (NWDAF), a discovery request to a New Network Repository Function (NRF);
receiving, by the NWDAF, a discovery response sent by the NRF, wherein an identity of a target network function (NF) and at least one of single-network slice selection assistance information (S-NSSAI) and a data network name (DNN) are carried in the discovery response;
determining, by the NWDAF, a first Internet Protocol (IP) address of a terminal device according to information carried in the discovery response; and
sending, by the NWDAF, the first IP address of the terminal device to the target NF;
wherein the NWDAF is a data sensing and analysis NF configured to automatically sense and analyze a mobile network based on network data, and the NRF is an NF configured to provide related services for an NF registration process and discovery process.

2. The method according to claim 1, wherein a data processing method is also carried in the discovery response.

3. The method according to claim 2, wherein the data processing method comprises at least one of data anonymization, data aggregation and data normalization.

4. The method according to claim 1, wherein information carried in the discovery request also includes at least one of:
an application identity;
an event identity;
a terminal identity; or
a requested data processing method.

5. A network function discovery apparatus comprising:
a transmitter configured to send a discovery request to a Network Repository Function (NRF);
a receiver configured to receive a discovery response sent by the NRF, wherein an identity of a target network function (NF) and at least one of single-network slice selection assistance information (S-NSSAI) and a data network name (DNN) are carried in the discovery response; and
a processor configured to determine a first Internet Protocol (IP) address of a terminal device according to information carried in the discovery response;
wherein the transmitter is further configured to send the first IP address of the terminal device to the target NF;
wherein the network function discovery apparatus is a Network Data Analytics Function (NWDAF), the NWDAF is a data sensing and analysis NF configured to automatically sense and analyze a mobile network based on network data, wherein the NRF is an NF configured to provide related services for an NF registration process and discovery process.

6. The apparatus according to claim 5, wherein a data processing method is also carried in the discovery response.

7. The apparatus according to claim 6, wherein the data processing method comprises at least one of data anonymization, data aggregation and data normalization.

8. The apparatus according to claim 5, wherein information carried in the discovery request also includes at least one of:
an application identity;
an event identity;
a user equipment (UE) identity; or
a requested data processing apparatus.

* * * * *